Patented Dec. 24, 1929

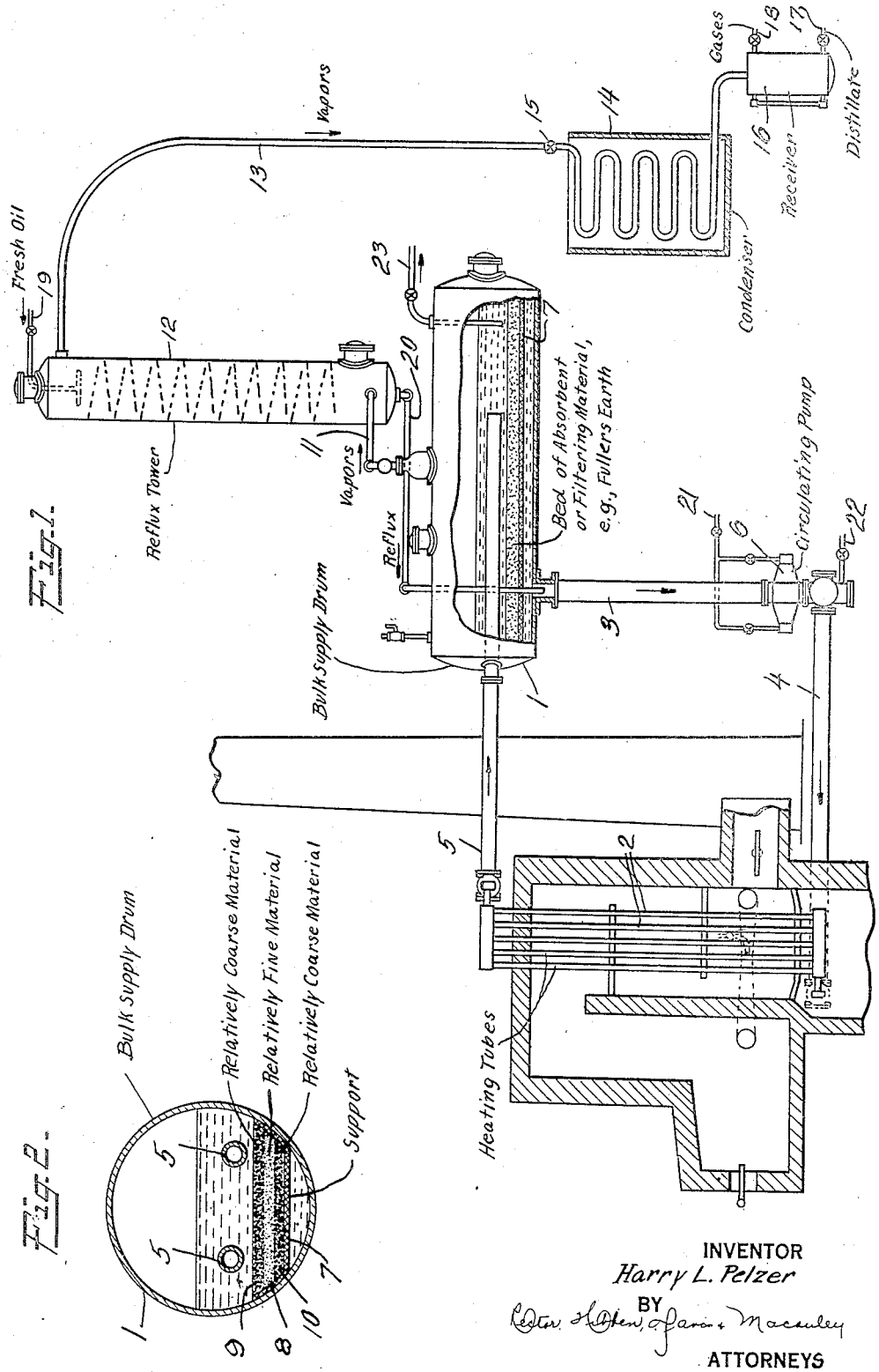

1,740,625

UNITED STATES PATENT OFFICE

HARRY L. PELZER, OF HIGHLAND, INDIANA, ASSIGNOR TO SINCLAIR REFINING COMPANY, OF NEW YORK, N. Y., A CORPORATION OF MAINE

REFINING OF HYDROCARBON OILS

Application filed June 11, 1927. Serial No. 198,158.

This invention relates to improvements in the cracking of heavier and higher boiling hydrocarbon oils, such as gas oil, for the production therefrom of lighter and lower boiling hydrocarbon oils, such as gasoline and gasoline-containing pressure distillates, by pressure distillation. In one advantageous method of carrying out such cracking pressure distillation, the charge of heavier oil in the still in which the distillation is effected is circulated downwardly through a bed of finely divided absorbent or filtering material, such as fuller's earth, then over heating surfaces or through heating tubes where it is heated to a cracking temperature, again through the bed of absorbent or filtering material, and so on, while the vapors of the cracked oil are driven out of the still. The present invention relates particularly to improvements in operations of this character.

As cracking proceeds in the charge of oil circulating in the pressure still, there is a progressive formation of pitch-like constituents which gradually accumulate in the charge. The pitch content of the still charge may be controlled by regulated withdrawal of pitch-laden oil from the charge and regulated supply of fresh oil thereto, but nevertheless the circulating still charge usually contains a certain amount of such pitch-like constituents after the operation has been under way for some time. One of the things accomplished by the bed of earth or other absorbent or filtering material through which the charge of oil is circulated in the still is further removed from the circulating charge of such pitch-like constituents. The maintenance of minimum concentrations of such pitch-like constituents in the still charge during operation is important in avoiding or reducing the formation of carbonaceous deposits which, particularly on heating surfaces or in heating tubes, necessitate periodic shutdown of the still for cleaning. As these pitch-like constituents are removed by the bed of absorbent or filtering material, they accumulate in the bed gradually rendering it ineffective. Likewise, as they accumulate in the bed of absorbent or filtering material they tend to reduce the freedom of circulation of the still charge therethrough. When the capacity of the bed of absorbent or filtering material is consumed, further formation of pitch-like constituents usually requires shutdown of the still for cleaning within a relatively short time thereafter. Restriction of the circulation of the still charge also tends to produce conditions requiring shut-down for cleaning as, to the extent that it reduces the rate at which oil is circulated over the heating surfaces or through the heating tubes, it tends to deprive the heating surfaces or heating tubes of the protective effect of the circulating, heat-absorbing oil and to cause local overheating. In some cases, such restriction of flow may cause premature shutdown of the still before the capacity of the bed of absorbent or filtering materials is consumed. The present invention relates particularly to improvements in the arrangement of the bed of absorbent or filtering material in operations of this character, whereby the capacity of the bed of absorbent or filtering material may be increased, whereby restriction of circulation through the bed of absorbent or filtering material may be reduced particularly in earlier stages of operation, and whereby the distillation operation may be made more uniform and also may be prolonged.

According to the present invention, the bed of absorbent or filtering material through which the charge of oil is circulated in the pressure still is arranged in layers, the average particle size in the topmost layer, that through which the circulating charge first passes, being relatively coarse and the average particle size in the next lower layer or layers being relatively fine. A layer in which the average particle size of the absorbent or filtering material is relatively coarse may also be interposed, with advantage, between the support on which the bed of absorbent or filtering material rests and the superimposed bed material. With this arrangement, the top layer of relatively coarse particle size apparently tends to promote a separation of part of the pitch-like constituents of the circulating charge as a crust on or in the top part of the bed of absorbent or filtering material where, exposed to the high temperature of the circulating charge, the separated pitch-like constituents are gradually converted into coke or coky particles which instead of consuming the filtering or absorbtive capacity of the bed may actually add to that capacity. The top layer of relatively coarse material may also prevent or reduce simple deposition of suspended components of the circulating charge in the main body of relatively fine material, leaving the main body of absorbent or filtering material more free to exert an absorptive action upon dissolved or partly dissolved pitch-like constituents in the charge of oil. In any event, the top layer retards clogging of the bed by deposition or absorption of components of the circulating charge. A layer of relatively coarse particle size between the support and the main body of absorbent or filtering material assists in retaining the finer superimposed material and also in reducing any tendency toward clogging of the supporting means.

The invention will be further described in connection with the accompanying drawings which illustrate, in a diagrammatic and conventional manner, one form of pressure cracking still embodying the invention and adapted for carrying out the invention, but it is intended and will be understood that this illustration and further description are for exemplification and that the invention is not limited thereto. In the drawings:

Fig. 1 represents, in elevation and partly in section with parts broken away, a pressure cracking still system, and Fig. 2 is a section through the drum of the still shown in Fig. 1.

Referring to the drawings, the pressure still proper comprises a drum or bulk supply tank 1, a battery of heating tubes 2 arranged in a furnace, and circulating connections 3, 4 and 5 including a circulating pump 6. Arranged within the drum 1 is a support 7 extending entirely across the drum and on this support is a body of finely divided absorbent or filtering material, such as fuller's earth. This support 7 may be of any convenient construction adapted to retain the finely divided material and to permit free circulation of the still charge therethrough; for example, it may be made up of one or more screens fine enough to retain the finely divided material interposed between a pair of perforated plates or between a pair of lattices made up of strips arranged edgewise with reference to the interposed screens. In operation, the normal liquid level in the drum 1 is maintained somewhat above the top of the bed of finely divided absorbent or filtering material, and the charge of oil is circulated, by means of the pump 6, from the drum 1 and below the bed upwardly through the heating tubes 2 and back to the drum 1 above the bed, thence downwardly through the bed, and so on. In a still in which the normal operating charge is in the neighborhood of from 8,000 to 10,000 gallons, this circulation, for example, may amount to from 500 to 5,000 gallons per minute.

The drum 1 in the still illustrated, for example, may be about 9 feet in diameter and 40 feet long. The bed of absorbent or filtering material therein may be, for example, from 10 to 18 inches deep. In carrying out the present invention, this bed is made up of at least two or three layers. As shown in the drawings, the bed is made up of three layers, a central layer 8 comprising the main body of the bed material the particles of which are relatively fine, a top layer 9 the particles of which are relatively coarse, and a layer 10 between the support 7 and the main body of the bed the particles of which are relatively coarse. The central layer 8, for example, may consist of from 3 to 5 tons of a commercial grade of 20-30 mesh fuller's earth. The upper and lower layers 9 and 10, for example, each may consist of about 1 ton of a commercial grade of 16-20 mesh fuller's earth of substantially larger average particle size than the fuller's earth employed in the central layer 8. Other absorbent of filtering materials useful in carrying out the invention include pulverized coke, calcined bauxite, treated clays, finely divided iron oxide, and the like. Whatever the material, it is arranged in layers as described in connection with fuller's earth. The average particle size in the several layers may vary from the examples given and the range of particle size in adjacent layers may overlap. For example, the central layer 8 may be made up of commercial 24-30 mesh or 24-36 mesh fuller's earth and the upper and lower layers 9 and 10 of commercial 10-30 mesh or 10-20 mesh fuller's earth of substantially larger average particle size than the fuller's earth employed in the central layer 8.

The vapors from the drum 1 escape through vapor line 11 to the reflux tower 12 from which vapors remaining uncondensed escape through the vapor line 13 to the condenser 14. The pressure in the system may be regulated by the valve 15 in the vapor line 13. In the production of gasoline from gas oil, for example, this pressure may be in the neighborhood of 100 to 300 pounds per square inch or more. The condenser 14 discharges into the receiver 16 from which the condensed distillate product is discharged through connection 17 and any uncondensed vapors and gases through connection 18. Fresh oil is supplied to the upper end of the reflux tower 12 through connection 19. As it flows downwardly through the tower over the baffles therein in direct contact with the rising vapors it assists in cooling the vapors and condensing the heavier components of the vapors and is itself preheated and freed of any light easily vaporized components. The unvaporized fresh oil and admixed reflux condensate flow back to the still from the lower end of the reflux tower 12 through connection 20. Part of the fresh oil may be supplied through the bearings of the circulating pump 6 for cooling and lubrication, through connection 21. Connection 22 is provided for initially charging the still at the beginning of a run and for pumping out the still at the end of a run. Connection 23 is provided for withdrawing pitch-laden oil, or tar, during the run.

This invention seems to be of special value and application in connection with operations in which the bed in the still through which the charge of oil is circulated is made up of fuller's earth. Fuller's earth apparently acts both as an absorbent and as a filtering material and also seems to have a selective action with reference to certain of the more objectionable pitch-like constituents which are formed during the cracking operation, particularly sulphur-containing pitch-like constituents. This invention apparently assists in making more effective such special capacities of the fuller's earth and in making them effective for a longer period during the cracking operation.

I claim:

1. In cracking hydrocarbon oils by distillation under pressure while circulating the charge of oil undergoing cracking distillation downwardly through a bed of finely divided absorbent material, the improvement which comprises maintaining a top layer of the absorbent material on the bed of coarser average particle size than that of the main body of absorbent material in the bed.

2. In cracking hydrocarbon oils by distillation under pressure, the improvement, which comprises circulating the charge of oil undergoing cracking downwardly through a bed of finely divided fuller's earth the top layer of which is of coarser average particle size than that of the main body of the fuller's earth in the bed during the distillation.

3. In cracking hydrocarbon oils by distillation under pressure while circulating the charge of oil undergoing cracking distillation downwardly through a bed of finely divided absorbent or filtering material, the improvement which comprises maintaining above and below the main body of absorbent or filtering material in the bed layers of the absorbent or filtering material of coarser average particle size than that of the main body of absorbent or filtering material.

4. In a pressure still for cracking hydrocarbon oils comprising a drum, a battery of heating tubes and circulating connections for circulating oil from a lower part of the drum through the battery of heating tubes back to an upper part of the drum, and means adapted to support a bed of finely divided solid material in the drum between the outlet and inlet circulating connections; a layer of relatively coarse absorbent material on said support means and a superimposed layer of relatively fine absorbent material.

5. In a pressure still for cracking hydrocarbon oils comprising a drum, a battery of heating tubes and circulating connections for circulating oil from a lower part of the drum through the battery of heating tubes back to an upper part of the drum, and means adapted to support a bed of finely divided material in the drum between the outlet and inlet circulating connections; a layer of relatively coarse absorbent or filtering material on said support means, a superimposed layer of relatively fine absorbent or filtering material, and a top layer of relatively coarse absorbent or filtering material.

6. In a pressure still for cracking hydrocarbon oils comprising a drum, a battery of heating tubes and circulating connections for circulating oil from a lower part of the drum through the battery of heating tubes back to an upper part of the drum, and means adapted to support a bed of finely divided solid material in the drum between the outlet and inlet circulating connections; a layer of relatively fine absorbent material carried by said support means and a top layer of relatively coarse absorbent material thereon.

In testimony whereof, I have subscribed my name.

HARRY L. PELZER.